UNITED STATES PATENT OFFICE.

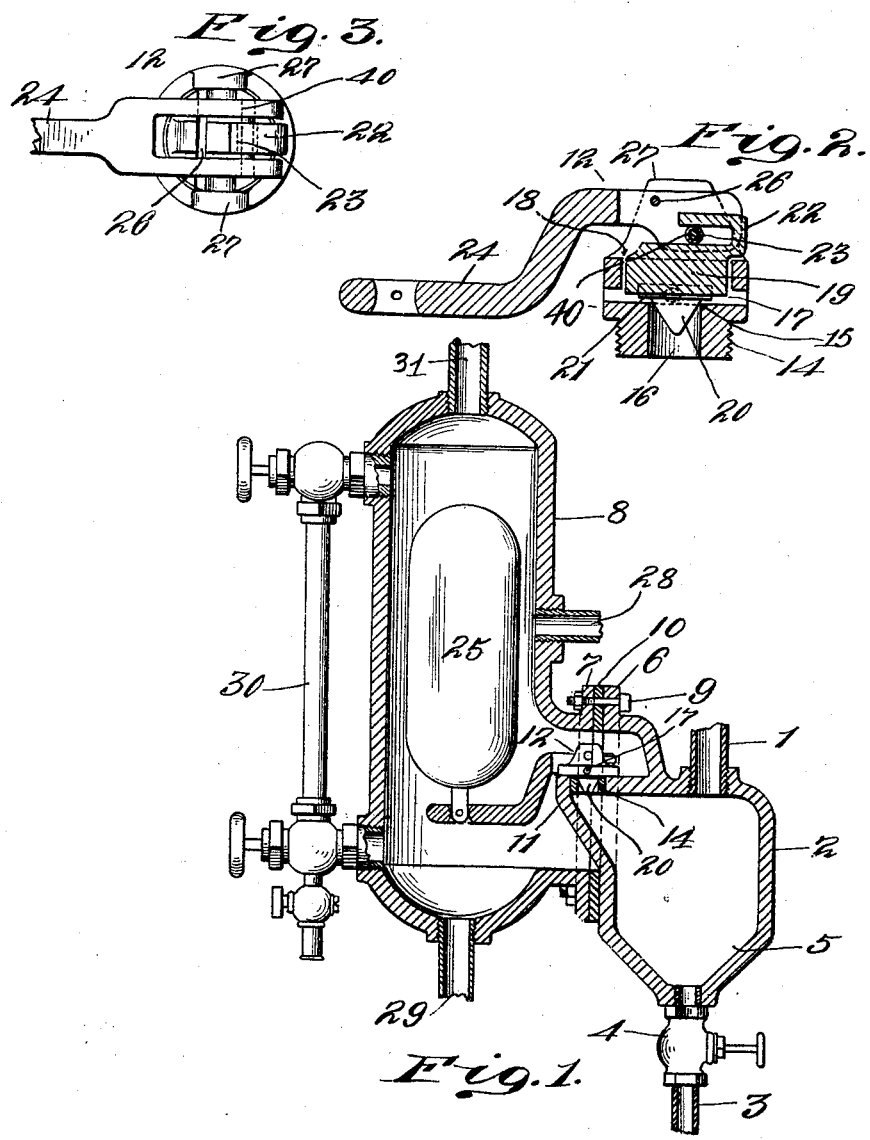

CHARLES E. GORTON, OF MONTCLAIR, NEW JERSEY, ASSIGNOR TO EDWARD MULLER, OF NEW YORK, N. Y.

FEED-WATER CLEANSER.

1,109,582.  Specification of Letters Patent.  Patented Sept. 1, 1914.

Application filed December 6, 1909. Serial No. 531,486.

*To all whom it may concern:*

Be it known that I, CHARLES E. GORTON, a citizen of the United States, residing at Montclair, in the county of Essex and State of New Jersey, have invented certain new and useful Improvements in Feed - Water Cleansers, of which the following is a full, clear, and exact specification.

My invention relates to cleansing and regulating the flow of a liquid.

It is useful for removing sediment and impurities from feed water for boilers and similar apparatus and controlling the supply to the boiler or apparatus.

It is particularly adapted for use in low-pressure steam boilers and hot water expansion tanks. Its use, however, is not confined to these two stated purposes, as its character renders it applicable for use in other situations.

The invention has for its object to provide efficient and novel means for settling water preparatory to feeding the same. All sediment, mud, etc., will be permitted to deposit itself and may be easily and directly blown out of the settling chamber.

One practicable form of my invention is illustrated in the accompanying drawings wherein—

Figure 1 is a central vertical section of a float chamber and settling chamber constructed according to this invention. Fig. 2 is a longitudinal section, enlarged, of the feed-water-valve; and Fig. 3 is a plan view thereof.

The inlet or supply pipe 1, is shown leading into the settling chamber 2, which settling chamber is shown provided with an outlet 3, which is provided with a valve 4. It will be seen that the inlet pipe is located out of alinement with the outlet pipe and that the water passing through the inlet pipe when the outlet is opened, will strike the tapered bottom portion 5, of the settling tank and cause a swirling motion of the water which will stir up and clean all sediment from the tank before the water passes out of the outlet 3. In the drawings the sediment outlet is shown at the bottom and the feed-water inlet is shown at the top and is shown out of alinement with the outlet. The inlet will be so placed that the water passing from it will strike some portion of the wall of the chamber 2, at such an angle that an agitation of the water will be had before it passes from the outlet. The piping arrangement illustrated furnishes this relation between the parts for the accomplishment of the phenomena alluded to. When the device is used in connection with supplying feed water to a boiler, a hose may be attached to the outlet 3, for wetting down the ashes and similar purposes so that the cleansing of the settling chamber will not be a separate operation requiring the waste of water, since this thing is done automatically and in a large sense without requiring special thought. The chamber 2 may preferably be made substantially cylindrical in horizontal section so that shoulders will not be presented for the accumulation of sediment.

The settling chamber is shown provided with a semi-circular flange 6, by means of which it may be attached to a circular flange 7 on the float-valve-chamber 8, by means of bolts 9, some of which bolts are shown passing through both flanges and some of which pass through flange 7 and are threaded into the lower part of the body of the settling chamber. A packing 10 is shown interposed between the joints of these two chambers (the float-valve-chamber and the settling chamber).

The upper portion of the settling chamber is provided with an offset or extension 11, which will provide room for the feed-water-valve 12, which in the present illustration is shown mounted upon the top of the chamber upon the side opposite the inlet and within a recess formed by the flanges 6 and 7. An opening is shown in the top plate of the settling chamber leading into the float-valve-chamber. Such opening is shown screw-threaded for receiving the threaded-shank 14 of the valve-seat-carrying member. The valve-seat 15 is formed at the termination of a bore 16, in the shank 14, with which communicate smaller ports 17, of which there are shown four. The ports 17 lead transversely from the bore 16 (which constitutes a port), and are shown disposed horizontally. These ports communicate with the float-valve-chamber 8. The upper part of the valve-seat-carrying member is formed with a central longitudinal opening 18, for receiving and guiding the valve-body 19. The valve-body carries a cone-valve 20 directed into the bore 16 and located in position to seat upon the valve-seat 15. The valve is preferably made of some non-corrosible material and is equipped at its upper end with a flange 21, extending beyond the zone of the valve-seat. This valve being tapering and located in the path of the passage of the water, will be scoured by the water in its passage and will be cleaned so that after each passage of water the valve and the valve-seat will be clean and free from sediment or coatings of any kind and upon being seated will form a water-tight joint.

The valve-body is provided in its upper portion with a horizontally-disposed lifting-arm 22, this forming a horizontal slot or space for receiving a lifting-roller-bearing 23. The roller-bearing 23 is mounted on a pin 40, carried by the bifurcated end of the float-valve-lever 24. The float-valve 25, which is located in the float-valve-chamber 8, is pivotally secured to the other end of this lever, the lever being fulcrumed at 26 between a pair of standing members 27, carried by the valve-seat-body. The pivotal axis of the float-valve-lever is shown located over the valve-seat and as the lifting-roller-bearing 23 swings or oscillates in the arc of a circle about said pivotal axis, it being located near it, only a slight lifting movement will be given to said valve relative to the amount of movement of the float, so that a slow feed will be assured. Any movement of the float responsive to the change of water level in the boiler, which will be communicated to the float-valve-chamber 8, by means of the water-outlet 29 and the steam inlet 31, will be communicated to the valve. A down movement of the float, even though slight, will open the valve slightly and permit the water to begin its movement from the settling chamber 2 to the chamber 8. At times it may be desirable to pass the water directly into the float chamber, for which purpose the float chamber is shown provided with an inlet 28. The float-chamber is also provided with a gage-column 30.

Although one form of my invention is illustrated and described, yet it will be apparent that changes may be made without departing from the spirit of the invention.

I claim:

1. A device of the character described, comprising a float chamber, a closed settling chamber removably secured thereto and having an out-let at the lower part thereof, the walls of said chamber sloping inwardly toward such out-let, an off-set portion formed on said settling chamber and adapted to extend within said float chamber and providing a valve seat, a valve, and an inlet at the upper part of said settling chamber located out of alinement with said out-let and in position to direct the incoming fluid toward said sloping walls whereby a swirling motion is given to the fluid and the sediment thereby removed from the sloping walls when said out-let is open.

2. A device of the character described comprising a float chamber, a closed settling chamber, formed with inwardly sloping walls, detachably secured to said float chamber and provided with an off-set portion projecting thereinto, and forming a valve seat, a float operated valve, a fluid inlet for said settling chamber located adjacent to said valve, an out-let arranged at the lower extremity of said settling chamber and positioned out of alinement with said inlet, whereby the contour of the walls of said chamber will serve to impart a rotary motion to the fluid entering through said inlet to carry off the sediment through said outlet and cleanse said settling chamber.

In witness whereof, I have hereunto set my hand in the presence of two subscribing witnesses.

CHARLES E. GORTON.

Witnesses:
 KARL B. SACHMANN,
 LILLIAN MAUCHER.